US009418446B2

(12) United States Patent
Chen et al.

(10) Patent No.: US 9,418,446 B2
(45) Date of Patent: Aug. 16, 2016

(54) METHOD AND APPARATUS FOR DETERMINING A BUILDING LOCATION BASED ON A BUILDING IMAGE

(71) Applicant: Nokia Technologies Oy, Espoo (FI)

(72) Inventors: Xin Chen, Evanston, IL (US); Andi Zang, Chicago, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/470,382

(22) Filed: Aug. 27, 2014

(65) Prior Publication Data

US 2016/0063732 A1  Mar. 3, 2016

(51) Int. Cl.
*G06K 9/00* (2006.01)
*G06T 7/40* (2006.01)
*G06K 9/46* (2006.01)
*G06K 9/62* (2006.01)

(52) U.S. Cl.
CPC ............... *G06T 7/40* (2013.01); *G06K 9/4604* (2013.01); *G06K 9/6202* (2013.01)

(58) Field of Classification Search
None
See application file for complete search history.

(56) References Cited

U.S. PATENT DOCUMENTS

| 8,942,483 B2 * | 1/2015 | Janky | 382/100 |
| 9,055,277 B2 * | 6/2015 | Katayama | H04N 13/0022 |
| 2003/0012410 A1 * | 1/2003 | Navab | G06K 9/209 |
| | | | 382/103 |
| 2009/0040309 A1 * | 2/2009 | Ishii | G08B 13/19645 |
| | | | 348/159 |
| 2010/0214291 A1 * | 8/2010 | Muller | G06K 9/4604 |
| | | | 345/420 |
| 2011/0010033 A1 * | 1/2011 | Asahara | G06D 1/024 |
| | | | 701/26 |
| 2015/0029188 A1 * | 1/2015 | Ege | G06T 17/05 |
| | | | 345/420 |
| 2015/0045058 A1 * | 2/2015 | Rudow | H04M 1/72572 |
| | | | 455/456.1 |
| 2015/0213590 A1 * | 7/2015 | Brown | G06T 17/05 |
| | | | 345/419 |

OTHER PUBLICATIONS

An Image-Based Positioning System [online] [retrieved Nov. 5, 2014]. Retrieved from the Internet: <http://rahuldotgarg.appspot.com/data/cse544.pdf>. (dated 2010) 8 pages.
Yu, Felix X., et al.; "Active Query Sensing for Mobile Location Search"; Proceeding MM'II Proceedings of the 19th ACM international conference on Multimedia; 2011; pp. 3-12.
Chen, David M., et al.; "City-Scale Landmark Identification on Mobile Devices"; IEEE Conference on Computer Vision and Pattern Recognition (CVPR); 2011; pp. 737-744.

* cited by examiner

*Primary Examiner* — Nancy Bitar
(74) *Attorney, Agent, or Firm* — Alston & Bird LLP

(57) ABSTRACT

A method, apparatus and computer program product are provided for determining a building location based on a building image. In the context of a method, the method includes receiving an image including at least one building, extracting building texture features from the image, and receiving reference building texture features. The method also includes determining, using a processor, building texture features comparisons between building texture features and reference building texture features which satisfy a predetermined match threshold and determining a matching building location based upon the building texture features comparison.

17 Claims, 11 Drawing Sheets

METHOD AND APPARATUS FOR DETERMINING A BUILDING LOCATION BASED ON A BUILDING IMAGE

TECHNOLOGICAL FIELD

An example embodiment of the present invention relates to location determinations and, more particularly, to a method, apparatus and computer program product for determining a building location based on a building image.

BACKGROUND

In some image-based positioning systems, the system may match details of a single building including text on doors or style of entrance. These building details may be limiting for matching purposes since there may be a common construction theme or building design used in multiple areas of a city or country. These building details may also be difficult to detect and may have added error due to camera angle or resolution. These location systems may return too many results due to the thin matching parameters, or return few or no results due to camera angle or resolution. Additionally, detailed building features may be difficult to determine and match due to camera position, e.g. angle or focal lengths differing from a reference building image.

Some city-scale landmark identifiers determine a match probability of an image to each of the reference landmark images. It is a tremendous computational and storage burden to store and match each image to all reference images. Additionally, the match determination may be limited by necessitating the landmark to be predominate in the image. Further, changes in regions proximate to the landmark may hinder search results as the processed image may not match the background features of the reference image.

BRIEF SUMMARY

A method, apparatus and computer program product are provided in accordance with an example embodiment for determining a building location based on a building image. In an example embodiment, a method is provided that includes receiving an image including at least one building, extracting building texture features from the image, and receiving reference building texture features. The method also includes determining, using a processor, building texture features comparisons between building texture features and reference building texture features which satisfy a predetermined match threshold and determining a matching building location based upon the building texture features comparisons.

In an example embodiment, the method also includes detecting building face blocks in the image, detecting edges within building face blocks, and the building texture features include detected edges and are extracted from the building face blocks. In some example embodiments, the method also includes determining a back projection based on the matched building location.

In some example embodiments, the method also includes determining a camera position based on the building location and back projection. In an example embodiment, this method also includes initializing an application based on the camera position.

In an example embodiment of the method, extracting building features also includes aligning and normalizing the building face blocks. In some example embodiments of the method, texture features include, window distribution, window area, window density, characters, or building color.

In another example embodiment, an apparatus is provided including at least one processor and at least one memory including computer program code, with the at least one memory and computer program code configured to, with the processor, cause the apparatus to at least receive an image including at least one building, extract building texture features from the image, and receive reference building texture features. The at least one memory and computer program code are also configured to cause the apparatus to determine, using a processor, building texture features comparisons between building texture features and reference building texture features which satisfy a predetermined match threshold and determine a matching building location based upon the building texture features comparisons.

In an example embodiment, the at least one memory and the computer program code, of the apparatus, are further configured to detect building face blocks in the image and detect edges within building face blocks, and the building texture features include detected edges and are extracted from the building face blocks. In some example embodiments of the apparatus the at least one memory and the computer program code are further configured to determine a back projection based on the matched building location.

In an example embodiment of the apparatus, the at least one memory and the computer program code are further configured to determine a camera position based on the building location and back projection. In some example embodiments of this apparatus, the at least one memory and the computer program code are further configured to initialize an application on the camera position.

In an example embodiment of the apparatus, extracting building features also includes aligning and normalizing the building face blocks. In some example embodiments of the apparatus, building texture features include window distribution, window area, window density, characters, or building color.

In a further embodiment, a computer program product is provided including at least one non-transitory computer-readable storage medium having computer-executable program code portions stored therein, with the computer-executable program code portions comprising program code instructions configured to receive an image including at least one building, extract building texture features from the image, and receive reference building texture features. The computer-executable program code portions also comprise program code instructions configured to determine building texture features comparisons between building texture features and reference texture features which satisfy a predetermined match threshold and determine a matching building location based upon the building texture features comparisons.

In an example embodiment of the computer program product, the computer-executable program code portions further comprise program code instructions configured to detect building face blocks in the image and detect edges within building face blocks, and the building texture features comprise detected edges and are extracted from the building face blocks. In some example embodiments of the computer program product, the computer-executable program code portions further comprise program code instructions configured to determine a back projection based on the matched building location.

In an example embodiment of the computer program product, the computer-executable program code portions further comprise program code instructions configured to determine a camera position based on the building location and back projection. In some example embodiments of this computer program product, the computer-executable program code portions further comprise program code instructions configured to initialize an application on the camera position. In an example embodiment of the computer program product, extracting building features also includes aligning and normalizing the building face blocks.

In yet another example embodiment, an apparatus is provided that includes means for receiving an image including at least one building, means for extracting building texture features from the image, and means for receiving reference building texture features. The apparatus also includes means for determining building texture features comparisons between building texture features and reference building texture features which satisfy a predetermined match threshold and means for determining a matching building location based upon the building texture feature comparisons.

BRIEF DESCRIPTION OF THE DRAWINGS

Figure 1:
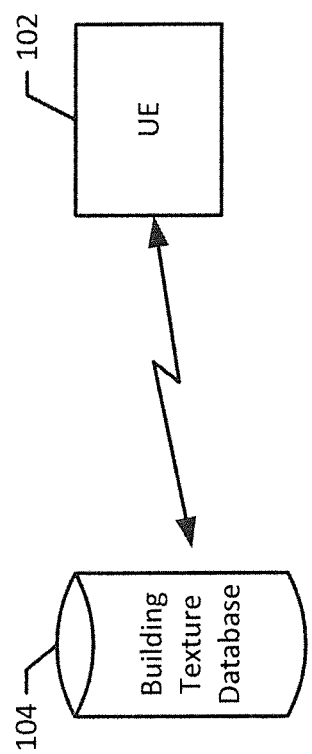
Figure 2:
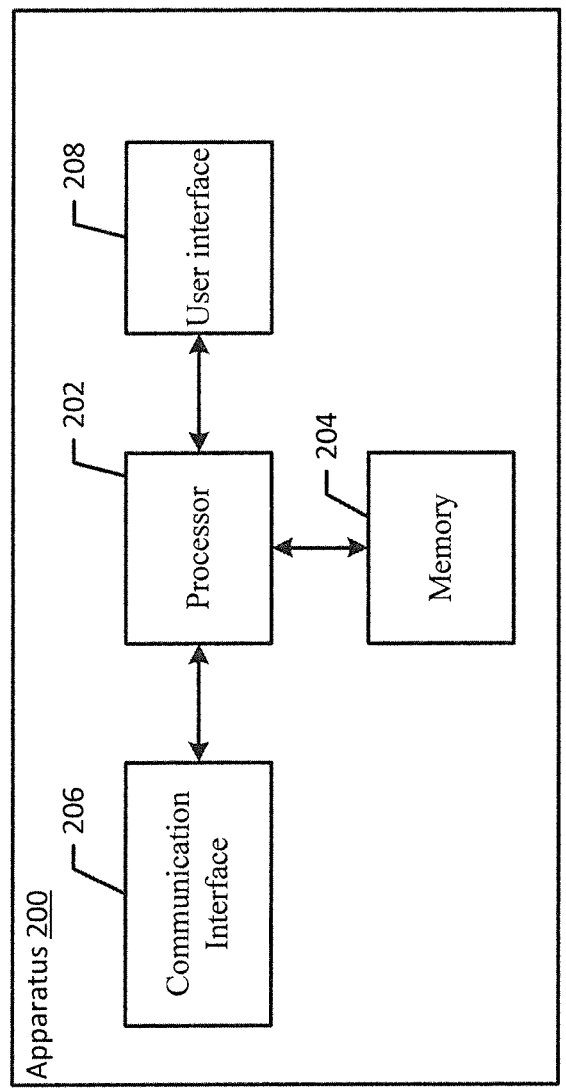
Figure 3:
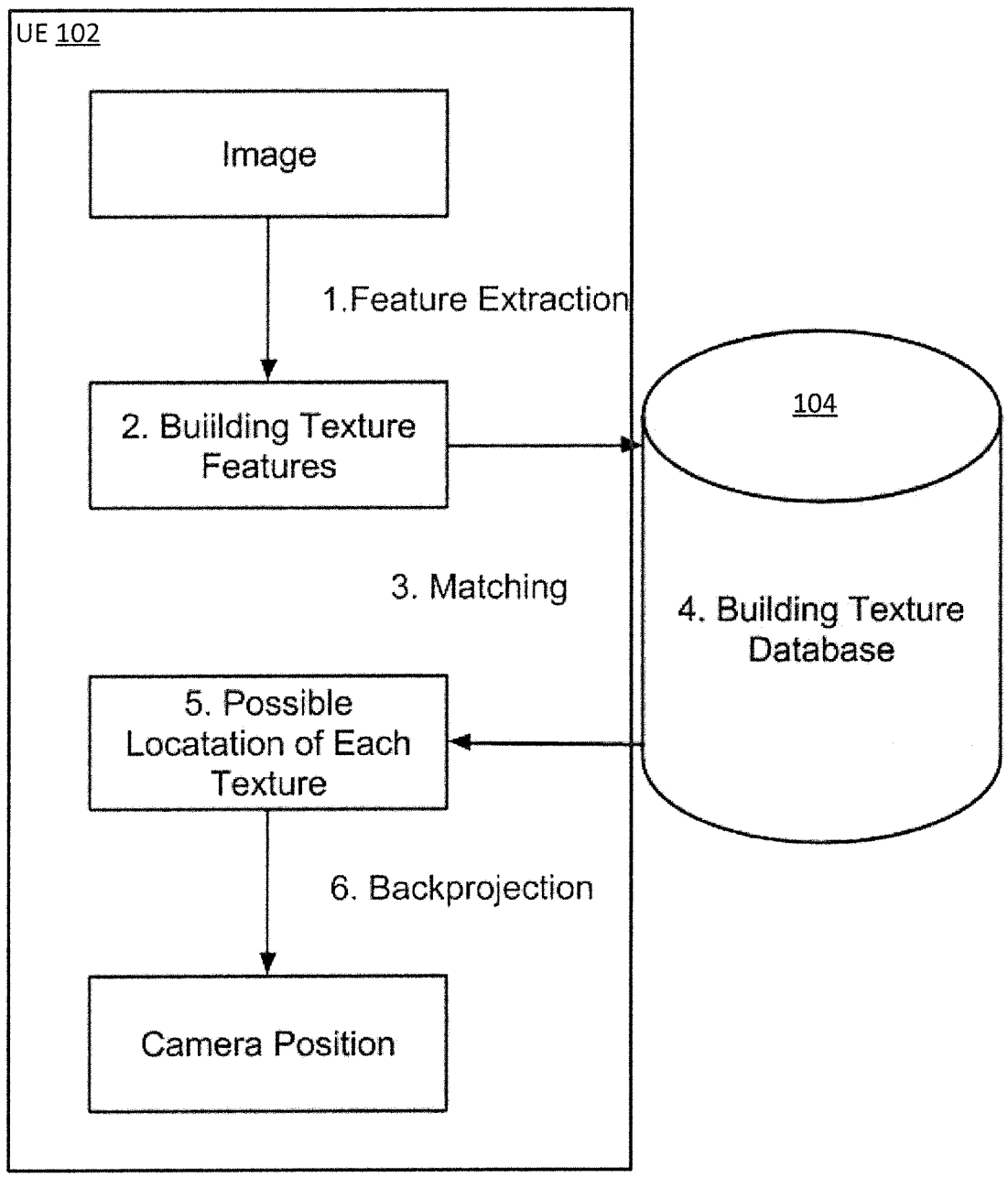
Figure 4:
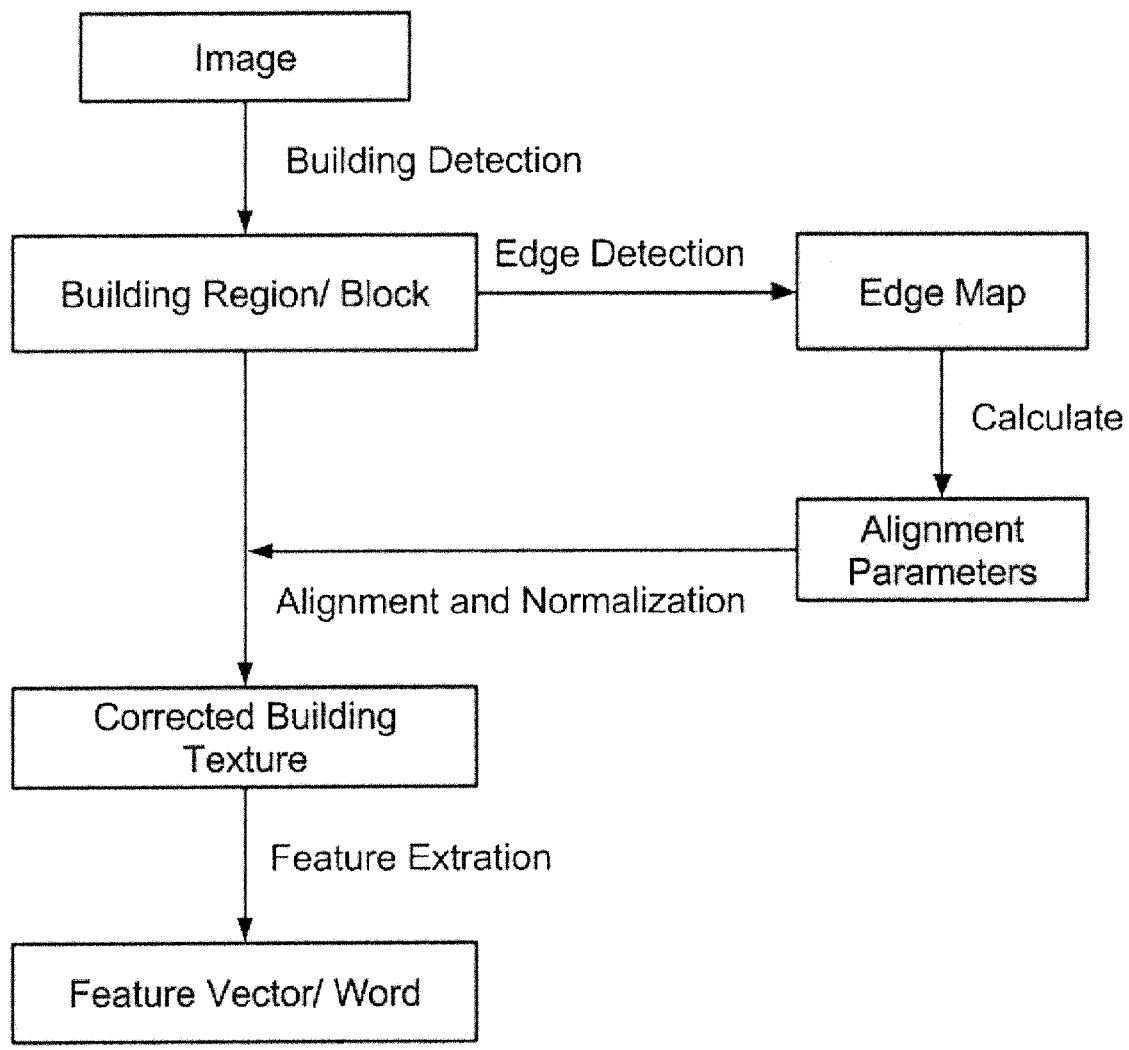

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for determining a building location based on a building image in accordance with an example embodiment of the present invention;

FIG. 3 illustrates an example process for determining a building location and camera position based on a building image in accordance with an example embodiment of the present invention;

FIG. 4 illustrates an example process for texture feature extraction in accordance with an example embodiment of the present invention.

Figure 5:
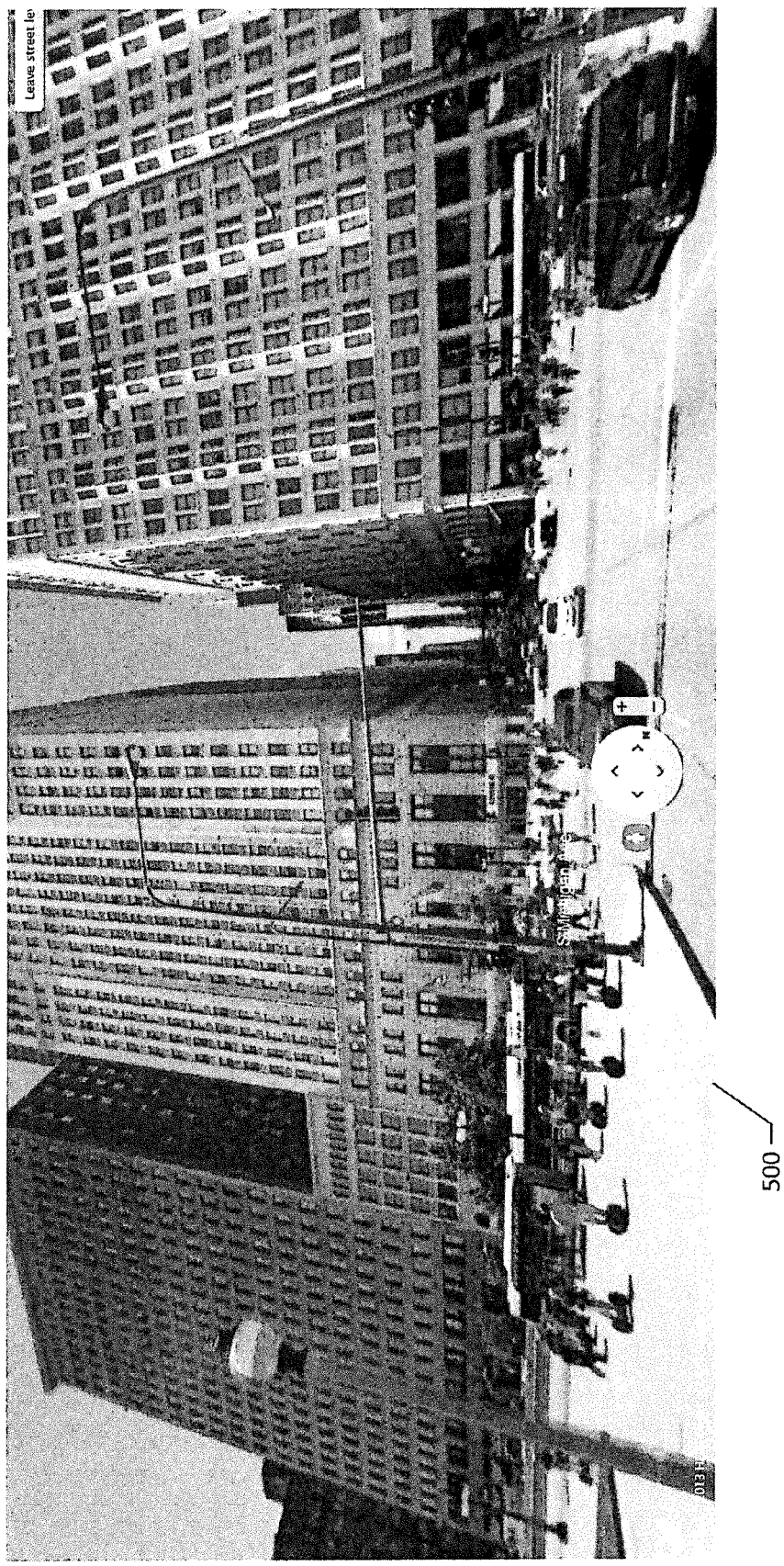
Figure 6:
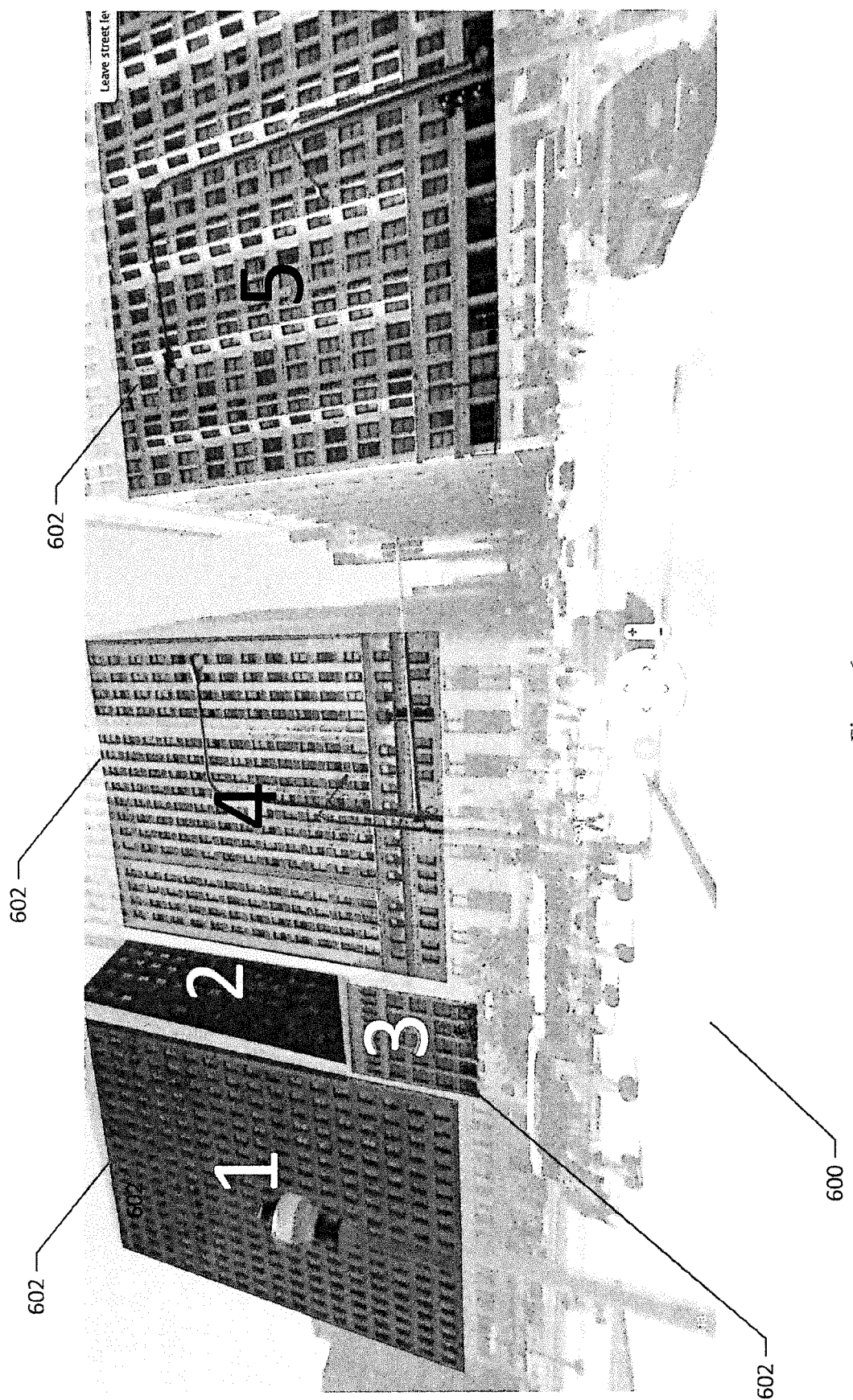
Figure 7:
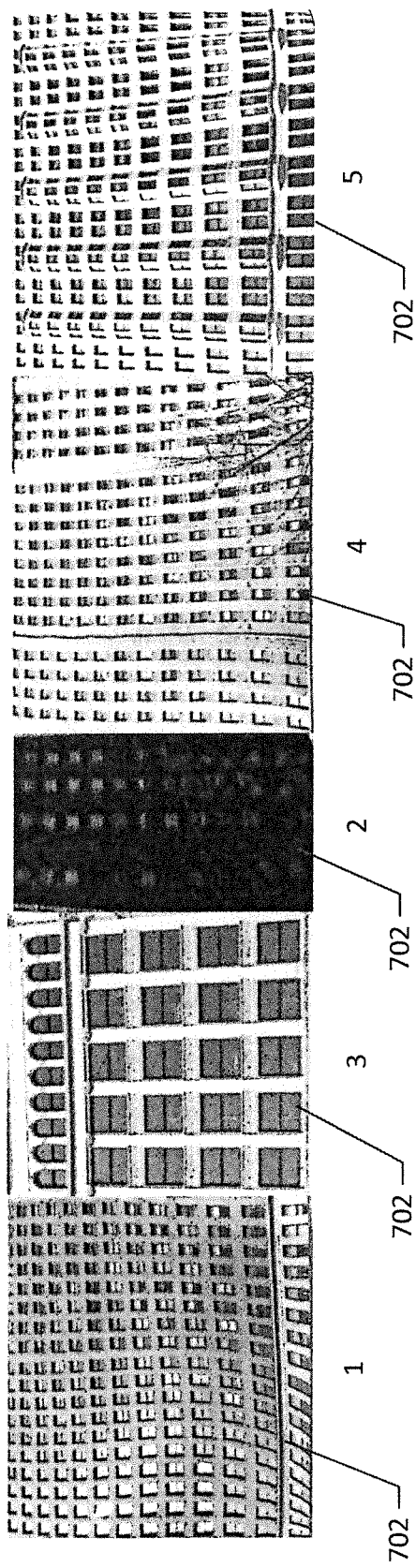
Figure 8:
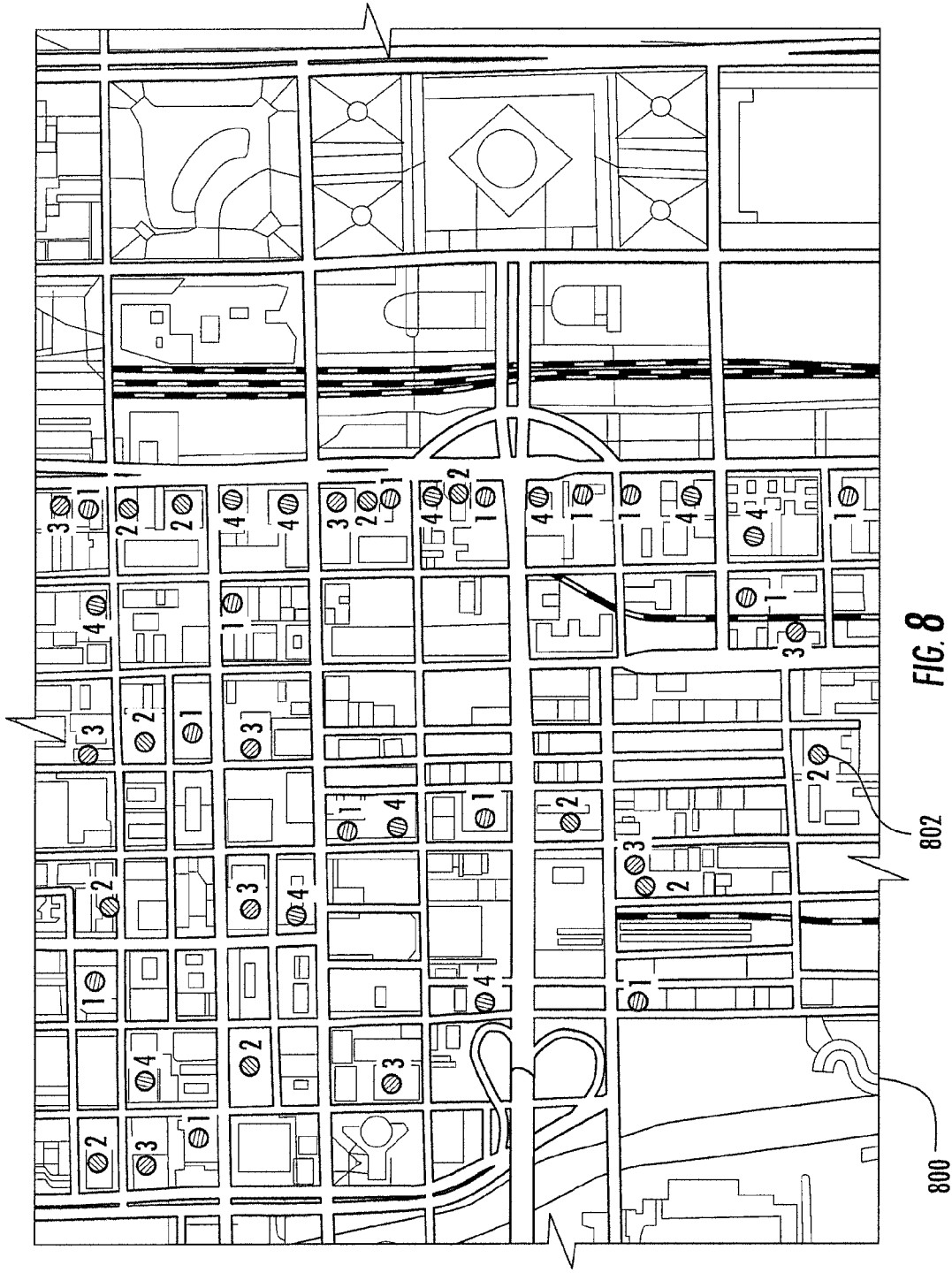
Figure 9:
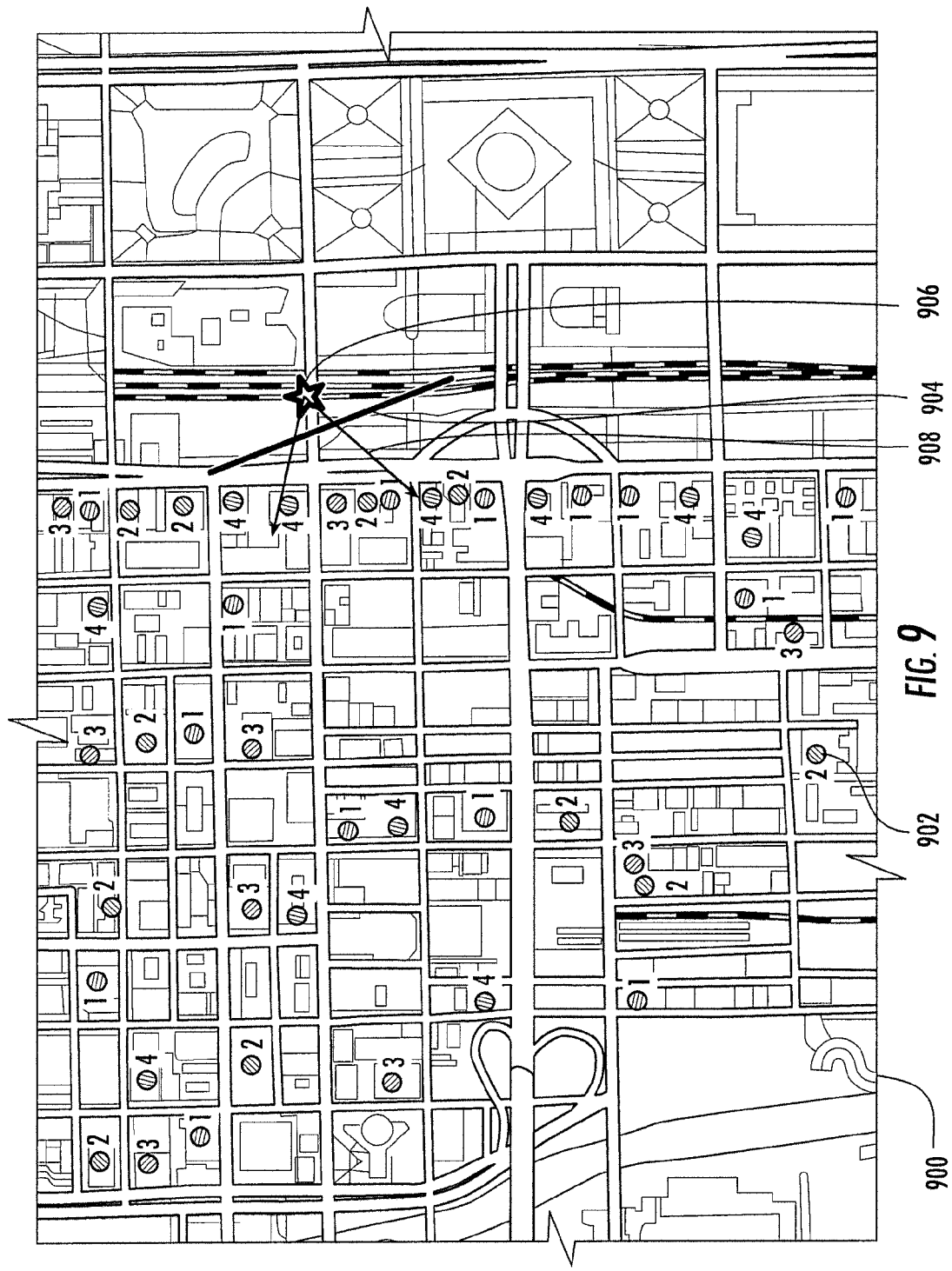
Figure 10:
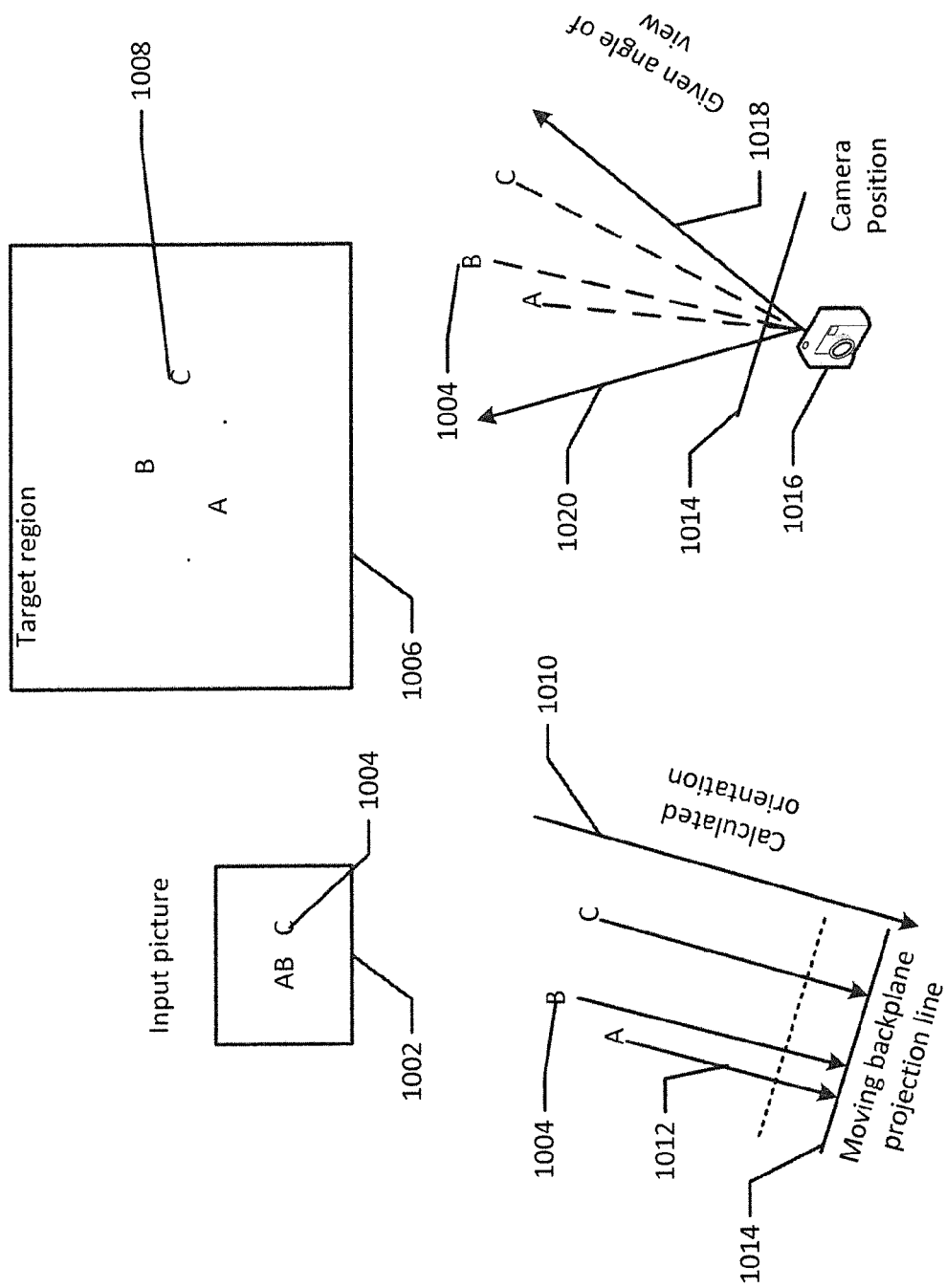
Figure 11:
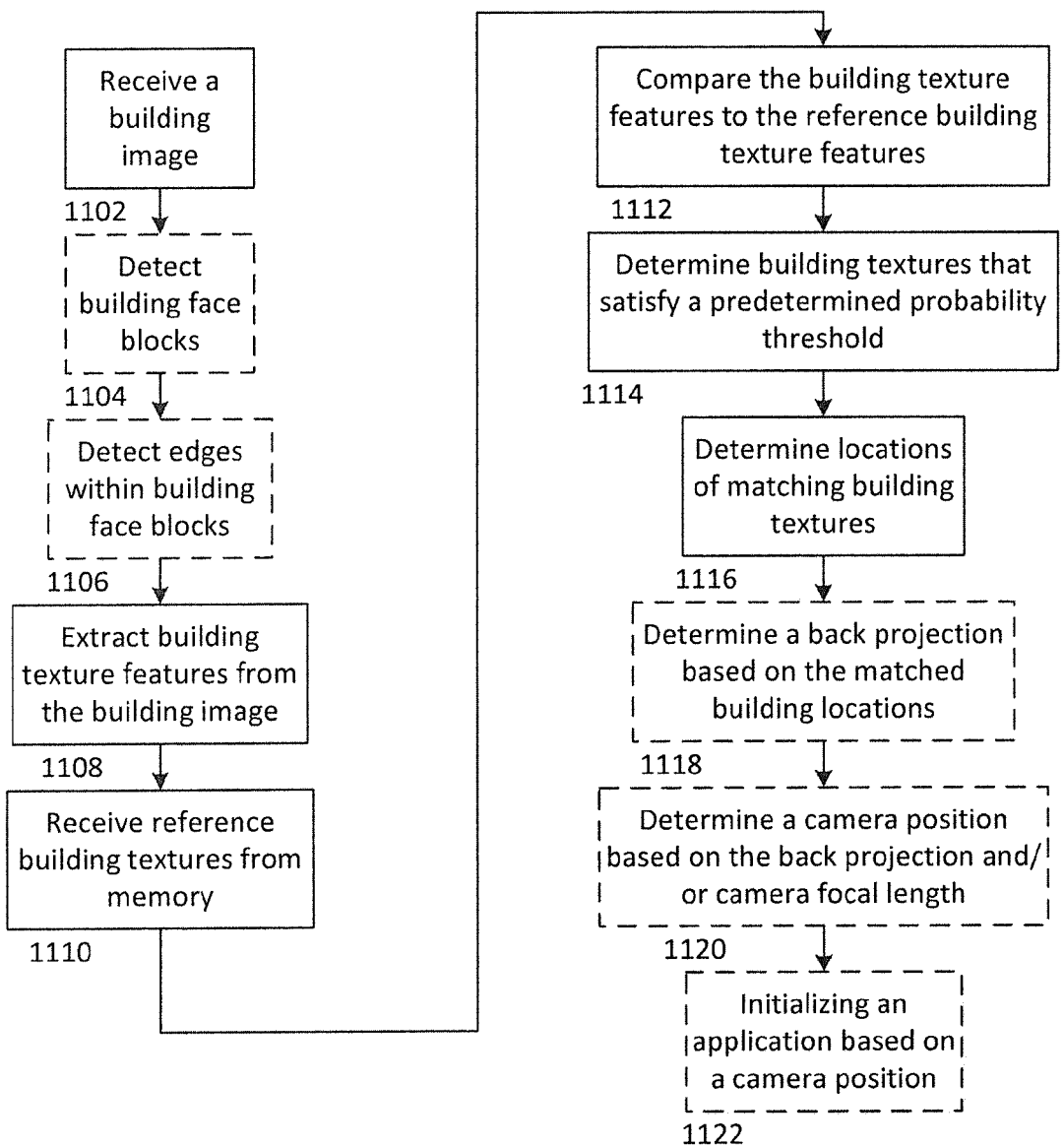

FIG. 5 illustrates an example building image in accordance with an example embodiment of the present invention;

FIGS. 6 and 7 illustrate example building face blocks in accordance with an example embodiment of the present invention;

FIG. 8 illustrates an example building location plot based in accordance with an example embodiment of the present invention;

FIGS. 9 and 10 illustrate an example camera position determination in accordance with an example embodiment of the present invention; and FIG. 11 is a flow chart illustrating the operations performed, such as by the apparatus of FIG. 2, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

Overview

Determining location based on a cluster of buildings or multiple faces of a building may allow processing requirements to be significantly reduced. The system would identify buildings and locations for each face present in an image, for example if an image had three buildings with four visible faces, e.g. the front of three buildings and the side of one, the system may extract the texture features of each face and match similar features in a building texture feature database, instead of matching the whole of the image. Texture features of buildings may be readily detected and alignment may be used to correct camera angle distortion.

The system may determine the locations of each building texture match and determine a line, or back projection, which would include the most texture features, e.g. position(s) in which the buildings in the image match with the greatest accuracy the determined building texture locations. For example the system may determine a back projection in which all three buildings may be aligned, or that all four visible faces are aligned.

The system may determine a camera position based on the distance of the buildings in the image, back projection, angle of view, or focal length associated with the building image. The camera position may be associated with the image for future reference, identified in internet posts of the image, such as social media, or the like.

In some embodiments, the system may continuously or periodically determine a camera position and use the camera position to initialize an application on the device. For example, if the system recognizes that an application, such as email, is used at a particular location, such as the bus stop, on a regular basis, through machine learning or entered by the user, the system may initialize the program based on the camera position.

Communications Diagram

A method, apparatus and computer program product are provided in accordance with an example embodiment for determining a building location based on a building image.

FIG. 1 illustrates a communication diagram including user equipment (UE) 102, in data communications with a building texture database 104. The UE 102 may include the building texture database 104, such as a local image data memory, or be associated with the image database, such as a remote image data server. The UE 102 may be a mobile computing device, such as a laptop computer, tablet computer, mobile phone, smart phone, navigation unit, personal data assistant, or the like. Additionally or alternatively the UE 102 may be a fixed computing device, such as a personal computer, computer workstation, kiosk, office terminal computer or system, or the like.

The UE 102 may receive an image from an associated memory or camera for location determination. The UE 102 may additionally or alternatively receive the image from an external source such as removable memory, portable memory, or an accessible network. The image may include at least one building or structure from a substantially facing position, e.g. the image is taken looking at least one face of the building or structure. The UE 102 may detect building face blocks and lines within the building image. The UE 102 may extract building texture features from the building face blocks. The UE 102 may receive reference building texture features from the building texture database 104. A building texture may include one or more building texture features.

The extracted building texture features may be compared to the reference building texture building texture features and assigned a probability value by the UE 102. The probability value may be compared to a predetermined probability threshold. The UE 102 may determine building textures as matches in an instance in which the assigned probability value satisfies a predetermined probability threshold. The UE 102 may determine the locations of the buildings which correspond to the matched building textures. The building locations may be used by the UE 102 to determine a back projection, e.g. a line in which all or a majority of the building textures of the building image can be viewed. Using the back projection, angle of view, focal length or the like, the UE 102 may determine a camera position, which may be associated with the building image. The camera position data may be stored in memory and/or used by the UE 102 to identify the camera or image locations in association with the image in applications, such as social media.

In some example embodiments, the UE 102 may, additionally or alternatively, initiate an application based on the determination of a camera position. A camera associated with the UE 102 may continuously or periodically capture building image data and determine a camera position. The UE 102 may open or initiate the application in response to the UE determining that the camera position is within a predetermined area. For example, in an instance in which the UE 102 determines a camera position to be associated with the bus stop or other mass transit waiting area, and the UE has been adapted to initialize the program in such a location, the UE may open or initiate the application.

Example Apparatus

A UE 102 may include or otherwise be associated with an apparatus 200 as shown in FIG. 2. The apparatus, such as that shown in FIG. 2, is specifically configured in accordance with an example embodiment of the present invention for determining a building location based on a building image. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by UE 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data from/to a communications device in communication with the apparatus, such as to facilitate communications with one or more user equipment 102, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example Building Location/Camera Position Determination Process

FIG. 3 illustrates an example process for determining a building location and camera position based on a building image in accordance with an example embodiment of the present invention. A building image, such as building image 500 of FIG. 5 may be received by the UE 102, from a memory, such as onboard memory, network memory, portable memory or the like, a camera, such as a camera associated with the UE or independent camera, or the like for camera position determination. The building image may include one or more buildings or building faces.

UE 102 may determine a building block face within the building image as discussed below in FIG. 4. In some embodiments multiple building face blocks may be determined and aligned, e.g. ordered from one side of the image to the other, such as left to right. In some example embodiments, alignment may include a relative position with respect to other building face blocks of the building image. The UE 102 may extract building texture features from the building face blocks. Building texture features may include, without limitation, window density, number of windows per unit area, window area, e.g. size of window, window distribution, e.g. how the windows are placed in the building or pattern, building color, number of doors, door placement, characters, e.g. text, or other extractable architectural features. The extraction process is discussed in detail in FIG. 4.

The UE 102 may request and receive reference building texture, e.g. reference building face block from the building texture database 104. The building texture may include multiple building texture textures. The building texture may be associated with location data, e.g. locations of buildings which possess the texture feature. The UE 102 may perform a comparison of the extracted building texture features with the reference building texture features for each building texture. The UE 102 may determine extracted textual features which match the building texture features of the building textures. For example, the UE 102 may assign a value or percentage to each texture feature match, such as 10% window distribution, and 10% number of doors. The UE 102 may then compare the value assigned to the respective building textures to a predetermined probability threshold, such as 70% match. In some example embodiments, the values may be weighted based on variability of the feature and image capturing, for example building color may have a low weight, such as 5% due to variance in color captured in differing light levels. The UE 102 may determine building textures which have satisfied the probability threshold, e.g. matching buildings for location determination. In an instance in which multiple building textures satisfy the probability threshold, the UE 102 may select the building texture with the highest probability value.

In an example embodiment, the UE 102 may determine and plot the locations of the buildings having building textures that satisfied the predetermined probability threshold. For example, if four building textures were identified, the UE 102 may plot the location of each building which included one of the matching building textures. The location data associated with each building texture may be used for plotting building locations. FIG. 8 depicts an example building location plot 800. The building location plot 800 includes building locations 802 designated by an icon or other indicia, such as a numbered (1-4) dot. In this example, the designations 1-4 correspond to the locations of four identified building textures within the image.

Using the building location plot the UE 102 may determine a back projection. A back projection may be a line from which the extracted building texture feature or building face block alignment most closely correlates with the building locations of the building location plot. The UE 102 may use the determined most probable building locations, alignment and relative position data to determine the calculated orientation of the orthographic projection, e.g. a means of representing three-dimensional objects in two dimensions. The orthographic projection is a form of parallel projection, where all the projection lines are orthogonal to the projection plane, resulting in every plane, e.g. building face blocks, of the scene appearing in affine transformation on the viewing surface, e.g. the perpendicular moving back projection. The calculated orientation of the orthographic projection is equal to the parallel lines. In other words the back plane projection is the line that may produce the same layout of building texture features, e.g. order and relative position.

In FIG. 9 a building location plot 900 is depicted including building locations 902, labeled 1-4 for the corresponding building textures. The building location plot 900 also includes a back projection 904 illustrating a line from which each of the identified building textures may be viewed in an identified alignment order, e.g. the order the building textures appear in the building image (top to bottom and/or left to right), as discussed below if FIG. 4.

FIG. 10 provides a more detailed example illustration for determination of the back projection 1012. The building image 1002, e.g. input image, may include buildings or building face blocks 1004, labeled A, B and C. The UE 102 may perform the extraction and location determination of the building texture features as discussed above and determine the most probable building locations 1008 in the building location plot 1006, e.g. a target region.

The UE 102 may use the determined most probable building locations, alignment and relative position data to determine the calculated orientation 1010 of the orthographic projection, e.g. a means of representing three-dimensional objects in two dimensions. The orthographic projection is a form of parallel projection, where all the projection lines 1012 are orthogonal to the projection plane, resulting in every plane, e.g. building face blocks 1008, of the scene appearing in affine transformation on the viewing surface, e.g. the perpendicular moving back projection 1014. The calculated orientation of the orthographic projection is equal to the parallel lines. In other words the back plane projection is the line that may produce the same layout of building texture features, e.g. order and relative position.

In an example embodiment, the UE 102 may determine a camera position, depicted as 906 in FIGS. 9 and 1016 in FIG. 10, based on the back projection 904/1014, a given angle of view 908/1018, camera focal length, or the like. The focal length may be provided as a portion of the building image data or be determined by the UE 102. In an instance in which the focal length is determined, the UE 102 may determine the angle of view 1018 based on the relative positions of the building locations in the image. Although, the angle of view is a strong indicator of focal length, in some embodiments the size of the charge-coupled device used to capture the image, may also be used to determine the focal length. Focal length is inversely proportional to the angle of view.

The focal length can then be used to determine the distance of the camera from the building locations 1008, since plotting the distances may indicate the target distance. The UE 102 may determine a orientation by determining a position along the back projection 904 which most closely corresponds to the building angle of the building image. The camera position 1016 may be determined by correlating the distance to target and the camera orientation.

In some example embodiment the camera position data may be associated with the building image and stored for later use, for example appending the camera position data to the image data and storing the building image data in a memory. The camera position data may be used to determine the location from which the building image was captured when subsequently viewed. In an example embodiment, the camera position may be used to update a location data field for electronic media, for example if a user uploads the image to a social media site, the camera position may be used to identify the location of the building image and/or the location of the camera position.

In another example embodiment, a camera associated with the UE 102 may continuously or periodically capture image data, including building images. The UE 102 may use the building images to determine a camera position and initiate applications based on the camera position correlating with a predetermined position. For example, the UE 102 may initiate or open an application such as email at mass transit waiting areas, e.g. bus stops. The application initiation predetermined position may be machine learned through respective user action, e.g. checking email each time the user is at a bus stop. In an instance in which the UE 102 has determined that the camera position matches the predetermined position the UE 102 may automatically, without user input, initiate or open the specified application.

Example Process for Texture Feature Extraction

FIG. 4 illustrates an example process for texture feature extraction of a building image in accordance with an example embodiment of the present invention. The UE 102 may receive the building image, as discussed in FIG. 3. The UE 102 may scan the building image, using object detection, to locate building texture regions, e.g. building face blocks. The object detection may be a Haar-like feature detection which may consider adjacent rectangular regions at a specified location in a detection window. The Haar-like feature recognition may then sum the pixel intensities of each region and calculate the differences between the sums. The difference is then used to categorize the subsections of the image, for example as building face blocks or non-building face blocks.

The UE 102 may extract some building features, such as building color, from the building face blocks prior to further processing.

The UE 102 may binarize the building image by applying a threshold segmentation algorithm to the construction design. The UE 102 may binarize the building image or may cooperate with another computing device to have the construction design binarized and then returned to the UE. The resultant binarized building image may have a first value, such as 1, applied to any pixel which satisfies a globally determined threshold, e.g. a black pixel. The binarized building image may have a second value, such as 0, assigned to pixels which do not satisfy the globally determined threshold, e.g. a white pixel.

In some example embodiments, the UE 102 may apply morphological operations on the binarized image as preprocessing for subsequent feature extraction. Morphological operations may include erosion, dilation, complement, intersections, union, opening, closing, or the like.

The UE 102 may preform edge detection, such as a local binary pattern (LBP), histogram of oriented gradients (HOG), Haar-like, spares coding, or the like. Edges may include outer edges or perimeter of the building faces, windows, doors, or the like. The building texture feature edges may be readily detected due to visual contrast, or indicated by shadows, or other such secondary indicators. The UE 102 may generate an edge map based on the detected edges.

In an example embodiment, the UE 102 may perform a second step threshold segmentation to amplify contrast and clarify building texture features. Two step threshold segmentation may allow for analysis of building images at small resolutions that may have been difficult using a canny edge detector, other corner detection algorithms, single threshold segmentation, or the like.

Additionally or alternatively the UE 102 may use other edge detection methods, such as line segment detector (LSD), canny edge detector, sobel edge detector, or the like to generate the edge map.

Based on the edge map the UE 102 may determine building face blocks with each building face block being define or outlined by one or more edges. The edge may that defines the building face blocks may include a perimeter of the building face and the edges detected within the building face block. An example of detected building face blocks is illustrated as 602 of FIG. 6, labeled 1-5.

The UE 102 may normalize the building face blocks for processing by determining if the building face block satisfies a predetermined scale threshold. In an instance in which the building face block does not satisfy the predetermined scale threshold, the UE 102 may adjust the building face block scale to satisfy the predetermined scale threshold. The normalization of the building face block ensures a uniform scale, such as 50×100 pixels, 200×400 pixels, or the like, is used in the process to reduce errors. The normalization may be advantageous since building face blocks are not always parallelograms, or even quadrilateral. One such scale adjustment method may include, determining the minimum parallelogram associated with the building face block, skewing, and/or resizing the building face block to a rectangle. Other example methods of adjusting the scale of the building face block may include applying morphing transformations and projection to an angle invariant circle, or the like.

The UE 102 may align the building face blocks based on order, e.g. left to right, and relative position in reference to respective building face blocks and/or the building image. Alignment parameters may be determined based on edges of building block faces of building features edges such as windows. The UE 102 may determine a change trend, such as a window area change trend, e.g. the farther the window location the smaller area it will fill with respect to closer windows on the same building block face. Based on a vertical and horizontal change trend to the UE 102 may align the building texture, e.g. the UE 102 may adjust the building block face to reduce or eliminate the change trend across the building block face, resulting in a building block face which is similar to a straight on view of the building block face. FIG. 7 illustrates an example of the building face blocks after alignment at a 200×400 pixel normalization.

The UE 102 may extract building texture features for reference building feature comparison using a feature extraction process, such as a histogram of oriented gradients (HOG), local binary pattern (LBP), Haar-like, spares coding, or the like. In an example embodiment, feature extraction may be performed using HOG with a 5×5 cell size, 2×2 block size, and a 50 percent overlap.

The UE 102 may determine the building texture feature vectors based on the feature extraction, which may be used to compare to the reference building texture building texture features.

Example Process for Camera Position Determination Based on Building Images

Referring now to FIG. 11, the operations performed, such as by the apparatus 200 of FIG. 2, for determining a building location based on a building image are depicted. As shown in block 1802 of FIG. 18, the apparatus 200 may include means, such as a processor 202, a communications interface 206, or the like, configured to receive a building image. The processor 202 may receive the building image from the communications interface 206, which in turn may receive the building image from a memory 204, such as an associated memory, removable memory, portable memory, network accessible memory, or the like. In an example embodiment, the communications interface 206 may receive the building image from a camera associated with the apparatus 200. An example building image is depicted in FIG. 5.

As shown in block 1104 of FIG. 11, the apparatus 200 may include means, such as a processor 202, or the like, configured to detect building face blocks. The processor 202 may scan the building image to locate building texture regions, e.g. building face blocks. The scan may utilize object recognition, such as Haar-like feature detection. Example building face blocks are depicted within the building image in FIG. 6.

In some example embodiments, some building texture features, such as building color may be extracted prior to further processing, as discussed at block 1108.

In an example embodiment, the processor may binarize the building image. The resultant binarized building image may have a first value, such as 1, applied to any pixel which satisfies a globally determined threshold, e.g. a black pixel. The binarized building image may have a second value, such as 0, assigned to pixels which do not satisfy the globally determined threshold, e.g. a white pixel.

The processor 202 may additionally or alternatively perform morphological operations on the building image, building face blocks, or binarized image as preprocessing for subsequent feature extraction.

As shown at block 1106, of FIG. 11, the apparatus 200 may include means, such as a processor 202, or the like, configured to detect lines within the building face blocks. In an example embodiment, the processor 202 may binarize the building image.

The processor 202 may additionally or alternatively perform morphological operations on the building image or binarized image as preprocessing for subsequent feature extraction. Morphological operations may include erosion, dilation, complement, intersections, union, opening, closing, or the like.

The processor 202 may preform edge detection, such as local binary pattern (LBP), histogram of oriented gradients (HOG), Haar-like, spares coding, or the like. Edges may include outer edges or perimeter of the building faces, windows, doors, characters, or the like. The processor 202 may generate an edge map for each building face block or the building image as a whole.

In an instance in which further clarity is desirable for edge detection, the processor 202 may perform a second step threshold segmentation to amplify contrast and clarify building texture features. The processor 202 may perform the second step segmentation prior to texture feature extraction at block 1108. In an example embodiment, in which insufficient edges are detected or insufficient building texture features are extracted, the processor 202 may perform the second step segmentation and reperform edge detection.

The processor 202 may normalize the building face blocks for processing by determining if the building face block satisfies a predetermined scale threshold and scaling the building face block as necessary to reduce errors.

In an example embodiment, the processor may determine alignment parameters, such as order and relative position of the building face blocks. The processor 202 may then align the building face blocks based on the alignment parameters. An example of aligned building face blocks 702 is depicted in FIG. 7.

As shown at block 1108 of FIG. 11, the apparatus 200 may include means, such as a processor 202, or the like, configured to extract building texture features from the building image. The processor 202 may extract building texture features for reference building texture feature comparison using a feature extraction process, such as histogram of oriented gradients (HOG), local binary pattern (LBP), Haar-like, spares coding, or the like. For example, the processor 202 may determine a window density per pixel area, façade color, and text, such as 10 windows per 100×100 pixels, yellow facade, red text "University Hotel."

As shown at block 1110 of FIG. 11, the apparatus 200 may include means, such as a processor 202, memory 204, or the like, configured to receive reference building texture features. The processor 202 may receive the reference building texture features from a memory 204, such as the building texture database 104.

As shown at block 1112 of FIG. 11, the apparatus 200 may include means, such as a processor 202, or the like, configured to compare the building texture features to the reference building textures. The reference building textures may include one or more building features. The processor 202 may assign a probability value or percentage to each building texture feature match, such as 1 or 10% for window distribution, 2 or 15% for number of windows, and 1 or 10% for number of doors for each building face block. Some probability values may be more or less heavily weighted due to variability of the feature and image capturing.

As shown at block 1114 of FIG. 11, the apparatus 200 may include means, such as a processor 202, or the like, configured to determine building textures that satisfy a predetermined threshold. The processor 202 may compare the probability value or percentage assigned to the respective reference building textures to a predetermined probability threshold, such as a value of 10 or 70%. Building texture features which satisfy the predetermined probability threshold are considered matches and processed further at block 1116.

In an instance in which multiple building textures satisfy the predetermined probability threshold, the processor 202 may select the building texture with the highest probability value or percentage.

As shown at block 1116 of FIG. 11, the apparatus 200 may include means, such as a processor 202, or the like, configured to determine the locations of the matching building textures. The building textures may be associated with location data correlated to buildings associated with the building texture. The processor 202 may plot the location of each building which is associated with building texture. An example building location plot is depicted in FIG. 8, in which building locations 802 are labeled 1-4 corresponding to the respective building textures.

As shown at block 1118 of FIG. 11, the apparatus 200 may include means, such as a processor 202, or the like, configured to determine a back projection based on the matched building locations. The processor 202 may determine a target area including the building locations or all or the highest number of building face blocks. The processor 202 may use the building locations in the target area, alignment data, and relative position data to calculate the orientation of an orthographic projection. Using the calculated orthographic orientation, the processor 202 may determine a movable back projection, or line that may produce the same layout of building face blocks as the building image.

As shown at block 1120 of FIG. 11, the apparatus 200 may include means, such as a processor 202, or the like, configured to determine a camera position associated with the building image. The processor 202 may determine the camera position based on the back projection, focal length, angle of view, or the like. The processor 202 may associate the camera position data with the building image, such as by appending the position data to the image data, and/or storing the position data in association with the image data in a memory 204. The position data may be used to identify the location associated with the buildings and/or camera in subsequent viewings or uses of the building image, such as updating a location field in a social media image upload, or the like. An example determination of the back projection and camera position is depicted in FIGS. 9 and 10.

As shown at block 1122 of FIG. 11, the apparatus 200 may include means, such as a processor 202, or the like, configured to initialize an application based on the camera position. The processor 202 may receive building images form an associated camera during normal operation for continuous or periodic position determinations. The processor 202 may be programmed manually, using a user interface 208 or through machine learning to initialize an application, such as email in response to the camera position being in a predetermined location, such as home, a mass transit waiting area, or the like.

The determination of camera position based on the building image may allow users to identify the location of pictures taken in instances in which user has forgotten or does not know the original location. Some examples may include analysis of images in law enforcement, or images taken by others.

In some example embodiments, locations can be automatically entered into digital media sharing sites, such as social media when posting images. In an example embodiment, a camera associated with the UE 102 may continuously or periodically capture building images and determine the location of the UE. In this embodiment, the UE 102 may initialize programs based on the camera position, without reliance on global positioning or text recognitions, such as street or building signs.

As described above, FIG. 11 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 1104, 1106, 1118, 1120, and 1122 in FIG. 11. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving an image, wherein the image comprises a cluster of buildings, wherein the image is taken from a facing position with respect to the cluster of buildings;
   extracting building texture features from the image;
   receiving reference building texture features;
   determining, using a processor, building texture features comparisons between building texture features of the cluster of buildings and reference building texture features which satisfy a predetermined match threshold;
   determining a matching building locations based upon the building texture features comparisons;
   determining a back projection so as to include a position in which the buildings in the image most accurately satisfy the matching building locations; and
   determining a camera position dependent upon the back projection that is based on the matching building locations and the building texture features comparisons.

2. The method of claim 1 further comprising:
   detecting building face blocks in the image; and
   detecting edges within building face blocks;
   wherein the building texture features comprise detected edges and are extracted from the building face blocks.

3. The method of claim 1 further comprising:
   determining the camera position based on the building locations and the back projection.

4. The method of claim 3 further comprising:
   initializing an application based on the camera position.

5. The method of claim 2, wherein extracting building features further comprises:
   aligning and normalizing the building face blocks.

6. The method of claim 1, wherein building texture features comprise, window distribution, window area, window density, characters, or building color.

7. An apparatus comprising at least one processor and at least one memory including computer program code, the at least one memory and computer program code configured to, with the processor, cause the apparatus to at least:
   receive an image, wherein the image comprises a cluster of buildings, wherein the image is taken from a facing position with respect to the cluster of buildings;
   extract building texture features from the image;
   receive reference building texture features;
   determine building texture features comparisons between building texture features of the cluster of buildings and reference building texture features which satisfy a predetermined match threshold;
   determine a matching building location based upon the building texture features comparisons;
   determine a back projection so as to include a position in which the buildings in the image most accurately satisfy the matching building locations; and
   determine a camera position dependent upon the back projection that is based on the matching building locations and the building texture features comparisons.

8. The apparatus of claim 7, wherein the at least one memory and the computer program code are further configured to:
   detect building face blocks in the image; and
   detect edges within building face blocks;
   wherein the building texture features comprise detected edges and are extracted from the building face blocks.

9. The apparatus of claim 7, wherein the at least one memory and the computer program code are further configured to:
   determine the camera position based on the building locations and the back projection.

10. The apparatus of claim 9, wherein the at least one memory and the computer program code are further configured to:
    initialize an application based on the camera position.

11. The apparatus of claim 8, wherein extracting building features further comprises:
    aligning and normalizing the building face blocks.

12. The apparatus of claim 1, wherein building texture features comprise, window distribution, window area, window density, characters, or building color.

13. At least one non-transitory computer-readable storage medium storing a computer program product having computer-executable program code portions stored therein, the computer-executable program code portions comprising program code instructions configured to:
    receive an image, wherein the image comprises a cluster of buildings, wherein the image is taken from a facing position with respect to the cluster of buildings;
    extract building texture features from the image;
    receive reference building texture features;
    determine building texture features comparisons between building texture features of the cluster of buildings and reference building texture features which satisfy a predetermined match threshold;
    determine a matching building location based upon the building texture features comparisons;
    determine a back projection so as to include a position in which the buildings in the image most accurately satisfy the matching building locations; and
    determine a camera position dependent upon the back projection that is based on the matching building locations and the building texture features comparisons.

14. The at least one non-transitory computer-readable storage medium of claim 13, wherein the computer-executable program code portions further comprise program code instructions configured to:
  detect building face blocks in the image; and
  detect edges within building face blocks;
  wherein the building texture features comprise detected edges and are extracted from the building face blocks.

15. The at least one non-transitory computer-readable storage medium of claim 13, wherein the computer-executable program code portions further comprise program code instructions configured to:
  determine the camera position based on the building locations and the back projection.

16. The at least one non-transitory computer-readable storage medium of claim 15, wherein the computer-executable program code portions further comprise program code instructions configured to:
  initialize an application based on the camera position.

17. The at least one non-transitory computer-readable storage medium of claim 14, wherein extracting building features further comprises:
  aligning and normalizing the building face blocks.

* * * * *